(12) United States Patent
Holcomb et al.

(10) Patent No.: US 8,646,821 B2
(45) Date of Patent: Feb. 11, 2014

(54) COLLAPSIBLE SCOOP AND SCRAPER

(71) Applicant: Chef'n Corporation, Seattle, WA (US)

(72) Inventors: David A. Holcomb, Seattle, WA (US);
Matthew Krus, Seattle, WA (US)

(73) Assignee: Chef'n Corporation, Seattle, WA (US)

( * ) Notice: Subject to any disclaimer, the term of this patent is extended or adjusted under 35 U.S.C. 154(b) by 0 days.

(21) Appl. No.: 13/631,568

(22) Filed: Sep. 28, 2012

(65) Prior Publication Data
US 2013/0082473 A1 Apr. 4, 2013

Related U.S. Application Data

(60) Provisional application No. 61/540,645, filed on Sep. 29, 2011.

(51) Int. Cl.
*A47F 13/08* (2006.01)

(52) U.S. Cl.
USPC ........................................ 294/180

(58) Field of Classification Search
USPC .............. 294/1.3–1.5, 176, 180; D7/691; 119/161, 867; 220/6, 8, 574, 666; 73/429; 206/218; 15/257.1, 257.6
See application file for complete search history.

(56) References Cited

U.S. PATENT DOCUMENTS

| | | | | |
|---|---|---|---|---|
| 203,991 A | * | 5/1878 | Bardell | 294/180 |
| D260,722 S | * | 9/1981 | Bateman | D7/691 |
| D267,357 S | * | 12/1982 | Hillstrom | D32/46 |
| 5,095,573 A | * | 3/1992 | Henke et al. | 15/105 |
| 7,048,317 B2 | * | 5/2006 | Netsch | 294/180 |
| D584,967 S | * | 1/2009 | Shamoon | D10/46.2 |
| 2004/0094978 A1 | | 5/2004 | Netsch | |
| 2004/0104587 A1 | | 6/2004 | Roberts | |
| 2011/0254296 A1 | * | 10/2011 | Chavez | 294/1.3 |

FOREIGN PATENT DOCUMENTS

| | | |
|---|---|---|
| EP | 0 719 708 A1 | 7/1996 |
| EP | 2 080 997 A1 | 7/2009 |
| JP | 09287996 A | 11/1997 |

\* cited by examiner

*Primary Examiner* — Stephen Vu
(74) *Attorney, Agent, or Firm* — Seed IP Law Group PLLC

(57) ABSTRACT

A device for scraping a surface and scooping items from the surface incorporates a body, a handle, a blade and a scoop. The body has a proximal portion, a distal portion and a central portion that fixedly couples the proximal portion with respect to the distal portion. The handle is located at the proximal portion of the body, and is adapted to be held by a user and to facilitate single-handed manipulation of the device by the user. The blade is located at the distal portion of the body, and is oriented to project outward from the body. The scoop is coupled to the central portion of the body, the scoop having a sidewall adapted to be folded in at least one location such that the sidewall can be expanded to form a scoop having a hollow portion for receiving the items, and can be collapsed by folding the sidewall such that the scoop is roughly the same thickness as other portions of the body.

10 Claims, 4 Drawing Sheets

COLLAPSIBLE SCOOP AND SCRAPER

BACKGROUND OF THE INVENTION

1. Field of the Invention

The present disclosure generally is related to kitchen tools, and more particularly, to tools for scraping and scooping food items or other items from a cutting board or other surface.

2. Description of the Related Art

A wide variety of tools exist for scraping surfaces and for scooping food items or other items from surface. A device that combines these functions has advantages.

BRIEF SUMMARY OF THE INVENTION

In one embodiment, a device for scraping a surface and scooping items from the surface incorporates a body, a handle, a blade and a scoop. The body has a proximal portion, a distal portion and a central portion that fixedly couples the proximal portion with respect to the distal portion. The handle is located at the proximal portion of the body, and is adapted to be held by a user and to facilitate single-handed manipulation of the device by the user. The blade is located at the distal portion of the body, and is oriented to project outward from the body. The scoop is coupled to the central portion of the body, the scoop having a sidewall adapted to be folded in at least one location such that the sidewall can be expanded to form a scoop having a hollow portion for receiving the items, and can be collapsed by folding the sidewall such that the scoop is roughly the same thickness as other portions of the body.

In another embodiment, a device for scraping a surface and scooping items from the surface incorporates a rigid body, a handle, a blade and a scoop. The rigid body has a proximal portion, a distal portion and a central portion extending therebetween. The handle is located at the proximal portion of the body, and is adapted to be held by a user and to facilitate single-handed manipulation of the device by the user. The blade is located at the distal portion of the body, and is oriented to project outward from the body. The scoop is formed in the central portion of the body, and has a sidewall with a plurality of features therein adapted to facilitate the sidewall being folded over on itself. The sidewall can be folded and unfolded between an expanded configuration in which the sidewall is unfolded and the scoop can receive the items and a collapsed configuration in which the sidewall is folded and the scoop is collapsed for storage.

BRIEF DESCRIPTION OF THE SEVERAL VIEWS OF THE DRAWING(S)

DETAILED DESCRIPTION OF THE INVENTION

Figure 1:
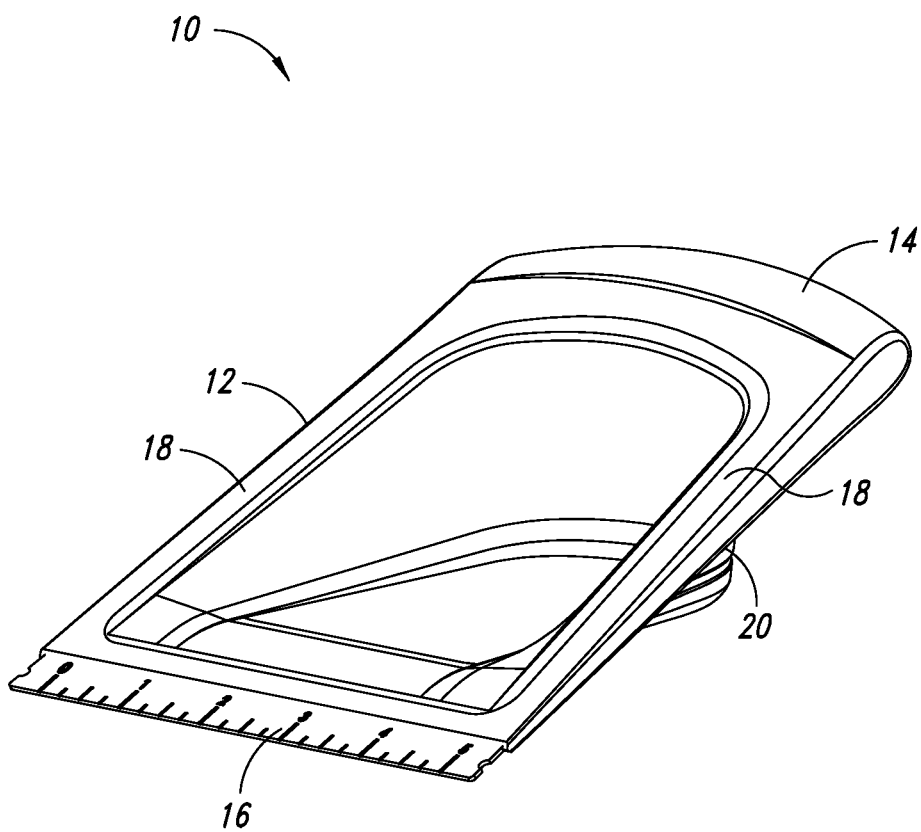
FIG. 1 is a perspective view of a device for scraping and scooping, according to one embodiment.
Figure 2:
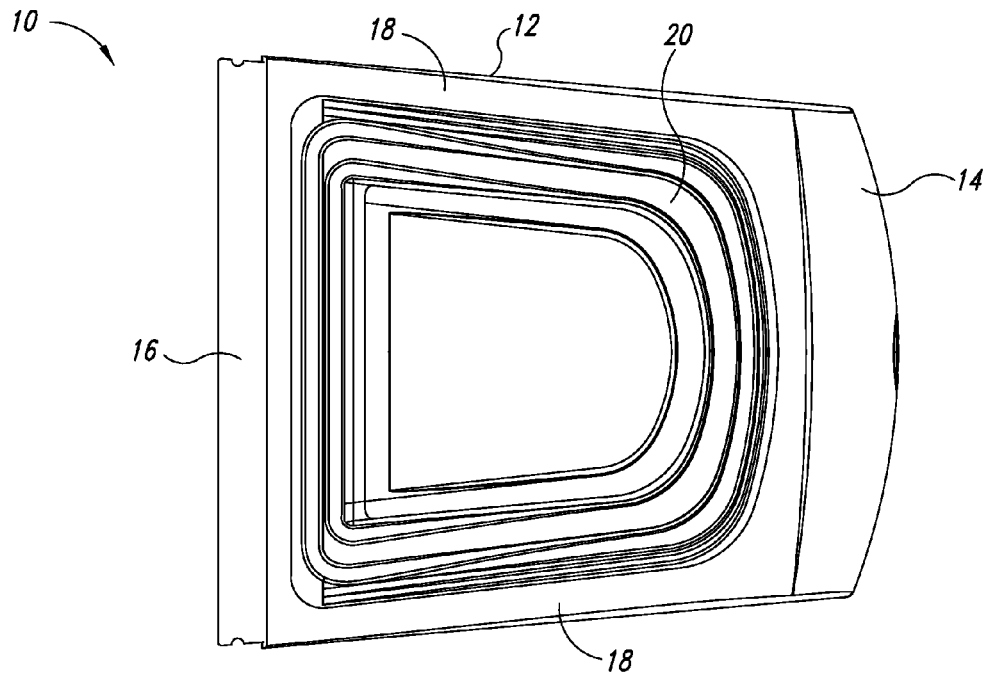
FIG. 2 is a bottom plan view of the device of FIG. 1.
Figure 3:
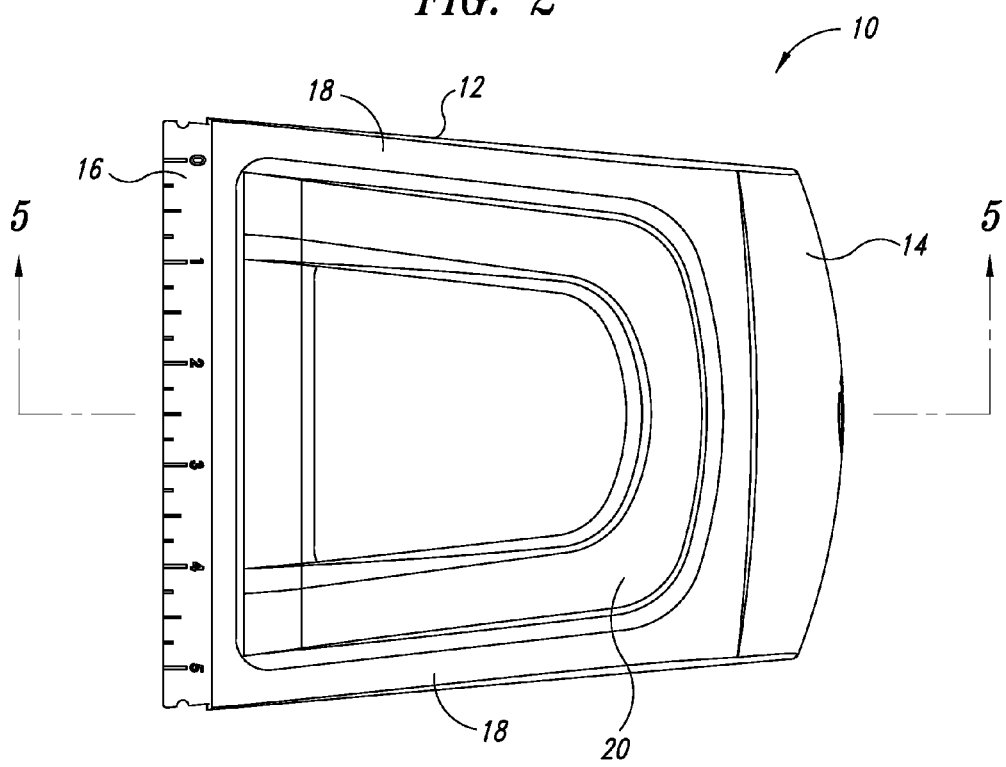
FIG. 3 is a top plan view of the device of FIG. 1.

The following detailed description is directed toward devices for scraping surfaces, such as a cutting board, and for scooping food items or other items from the surface. The following detailed description and corresponding figures are intended to provide an individual of ordinary skill in the art with enough information to enable that individual to make and use the illustrated embodiment of the invention. Such an individual, however, having read this entire detailed description and reviewed the figures, will appreciate that modifications can be made to the illustrated and described embodiment, and/or elements removed therefrom, without deviating from the spirit of the invention. It is intended that all such modifications and deviations fall within the scope of the invention, to the extent they are within the scope of the associated claims.

Reference throughout this specification to "one embodiment" or "an embodiment" means that a particular feature, structure or characteristic described in connection with the embodiment is included in at least one embodiment of the disclosed methods and structures. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

FIGS. 1-4, 6 and 7 generally illustrates a device 10 for scraping and/or scooping food items or other items from a surface such as a countertop or cutting board. The device 10 has a body 12 that extends longitudinally from a handle 14 at its proximal end (as oriented during use) to a blade 16 at its distal end. A pair of siderails 18 extends lengthwise along the opposing lateral sides of the body 12. A scoop 20 is located centrally with respect to the body 12, laterally between the two siderails 18 and longitudinally between the handle 14 and the blade 16. An individual of ordinary skill in the art, having reviewed this entire disclosure, will immediately appreciate that changes can be made to the illustrated embodiment without deviating from the spirit of the invention.

The illustrated embodiment is manufactured from nylon, plastic, silicone or the like as a single, monolithic piece, and can be injection molded or manufactured through equivalent known methods. The device 10 can be overmolded in sections to provide additional features, such as a handle 14 with increased grip. Similarly, portions of the device 10 can be made from a different material; for example, the blade 16 could be made from a harder plastic, nylon, metal or other material, molded into the larger body 12. These and other details and variations can be incorporated into embodiments of the device 10 without deviating from the spirit of the invention.

The illustrated handle 14 is sized and shaped to fit comfortably in a user's hand during such activities. In the illustrated embodiment, the handle 14 is rigidly connected to the two siderails 18, and the siderails are rigidly connected to the blade 16. As a result, a user holding the handle 14 can urge the blade 16 against a surface, such as a chopping block or cutting board, and can slide the blade along the surface to scrape materials off of the surface or to scoop items into the scoop 20.

Figure 4:
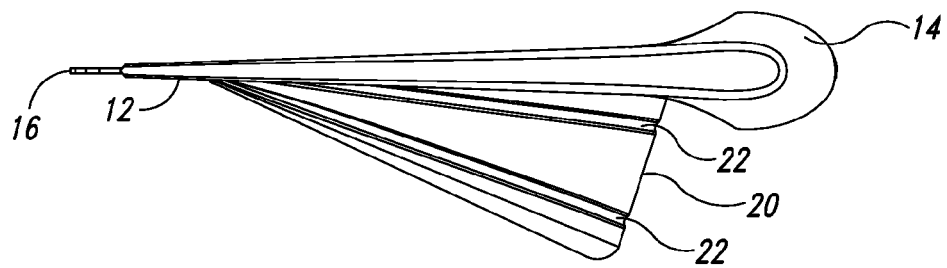
FIG. 4 is a side elevation view of the device of FIG. 1, in an expanded configuration.
Figure 5A:
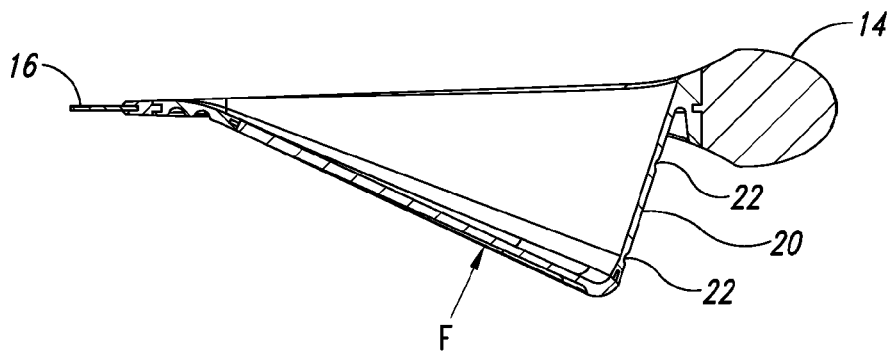
FIG. 5A is a cross-sectional view of the device of FIG. 1, as viewed along Section 5-5 of FIG. 3, in the expanded configuration.
Figure 5B:
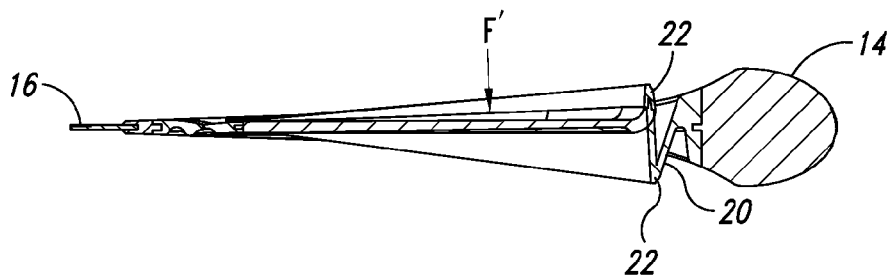
FIG. 5B is a cross-sectional view of the device of FIG. 1, as viewed along Section 5-5 of FIG. 3, in a collapsed configuration.
Figure 6:
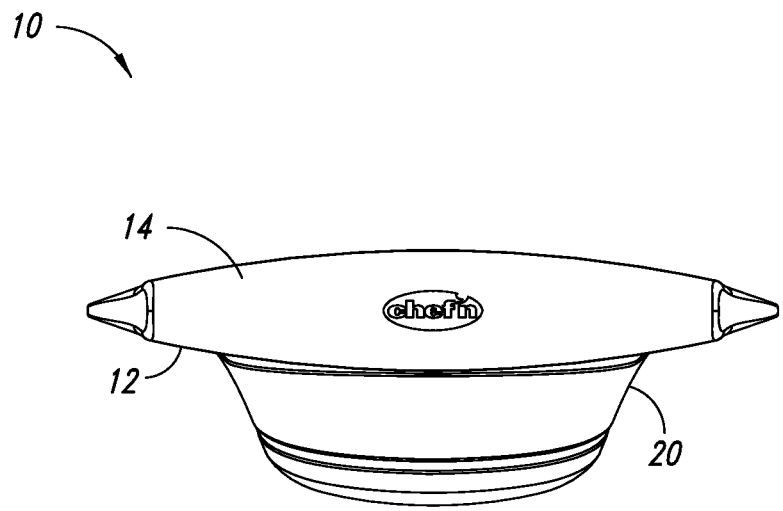
FIG. 6 is a rear elevation view of the device of FIG. 1, in the expanded configuration.
Figure 7:
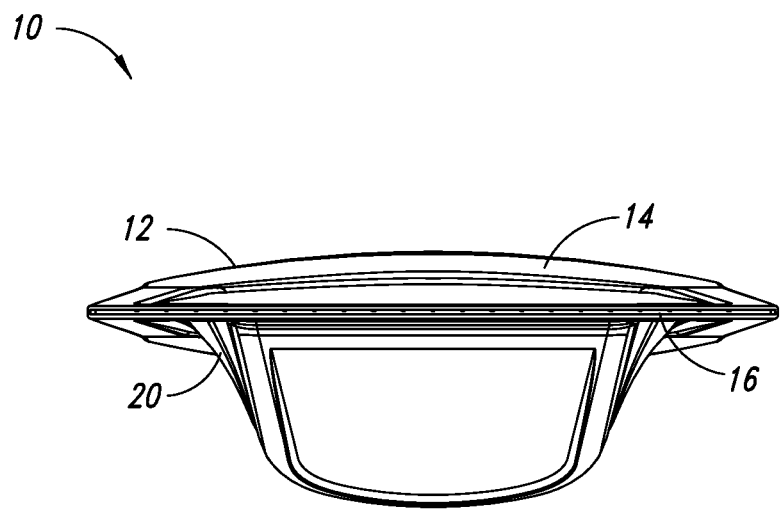
FIG. 7 is a front elevation view of the device of FIG. 1, in the expanded configuration.

The illustrated embodiment is adapted to be expanded for use, and collapsed between uses to facilitate storage in a drawer or other location where it may be desirable for the device 10 to be as flat and thin as possible. FIG. 5A shows the device 10 in an expanded configuration for use, and FIG. 5B shows the device in a collapsed configuration for storage. The illustrated scoop 20 wall is formed with two living hinges 22 incorporating creases or other features that facilitate folding of the wall. As best seen in FIG. 4, the living hinges 22 are widest at the proximal end of the scoop, closest to the handle 14, and converge toward each other as they approach the distal end of the scoop, closest the blade 16. As a result, when a collapsing force F is exerted on the bottom of the scoop 20, as illustrated in FIG. 5A, the scoop wall folds over upon itself. As it folds, the wall of the illustrated scoop 20 buckles to form a "Z" shaped cross-section, as best seen in FIG. 5B. Because the living hinges 22 converge, the scoop 20 collapses more at its proximal end than at its distal end. As a result, the scoop 20 collapsed from having a triangular profile to a flat profile. To return the scoop 20 from the collapsed configuration to the expanded configuration, an expanding force F' can be exerted on the inside of the collapsed scoop, as shown in FIG. 5B. An individual of ordinary skill in the art, having reviewed this entire disclosure, will immediately appreciate that changes can be made to the scoop 20, the wall, the living hinges 22 and other features without deviating from the spirit of the invention. For example, a device having a larger scoop may have more creases allowing the larger scoop wall to fold several times between the expanded and collapsed configurations.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A device for scraping a surface and scooping items from the surface, the device comprising:
    a body having a proximal portion, a distal portion and a central portion fixedly coupling the proximal portion to the distal portion;
    a handle located at the proximal portion of the body, the handle being adapted to be held by a user and to facilitate single-handed manipulation of the device by the user;
    a blade located at the distal portion of the body, the blade being oriented to project outward from the body; and
    a scoop coupled to the central portion of the body, the scoop having a sidewall comprising at least one living hinge adapted to be folded such that the sidewall can be expanded to form a scoop having a hollow portion for receiving the items, and can be collapsed by folding the sidewall such that the scoop is roughly the same thickness as other portions of the body.

2. The device of claim 1 wherein the handle and body are formed from a single material.

3. The device of claim 1 wherein the handle, body and blade are formed from a single material.

4. The device of claim 1 wherein the central portion of the body extends an entire distance from the handle to the blade.

5. The device of claim 1 wherein the central portion of the body extends along opposing lateral sides of the body an entire distance from the handle to the blade.

6. The device of claim 1 wherein the central portion of the body extends along opposing lateral sides of the body an entire distance from the handle to the blade, and wherein the scoop is located laterally between two opposing central portions of the body.

7. The device of claim 1 wherein the handle, body, blade and scoop are formed from a single material.

8. A device for scraping a surface and scooping items from the surface, the device comprising:
    a rigid body having a proximal portion, a distal portion and a central portion extending between the proximal portion and the distal portion;
    a handle located at the proximal portion of the body, the handle being adapted to be held by a user and to facilitate single-handed manipulation of the device by the user;
    a blade located at the distal portion of the body, the blade being oriented to project outward from the body; and
    a scoop formed in the central portion of the body, the scoop having a sidewall with a plurality of living hinges adapted to facilitate the sidewall being folded over on itself at least once between an expanded configuration in which the sidewall is unfolded and the scoop can receive the items and a collapsed configuration in which the sidewall is folded and the scoop is collapsed for storage.

9. The device of claim 8 wherein the living hinges in the sidewall comprise creases.

10. The device of claim 8 wherein there are two living hinges in the sidewall.

* * * * *